US010979951B2

(12) United States Patent
Suzuki et al.

(10) Patent No.: US 10,979,951 B2
(45) Date of Patent: Apr. 13, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, New Territories (HK)

(72) Inventors: Shoichi Suzuki, Sakai (JP); Shohei Yamada, Sakai (JP); Wataru Ouchi, Sakai (JP); Tomoki Yoshimura, Sakai (JP); Liqing Liu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 7 days.

(21) Appl. No.: 16/466,834

(22) PCT Filed: Dec. 8, 2017

(86) PCT No.: PCT/JP2017/044168
§ 371 (c)(1),
(2) Date: Jun. 5, 2019

(87) PCT Pub. No.: WO2018/105725
PCT Pub. Date: Jun. 14, 2018

(65) Prior Publication Data
US 2019/0297549 A1  Sep. 26, 2019

(30) Foreign Application Priority Data

Dec. 9, 2016 (JP) .............................. JP2016-239425

(51) Int. Cl.
*H04L 29/06* (2006.01)
*H04W 36/08* (2009.01)
(Continued)

(52) U.S. Cl.
CPC ........... *H04W 36/08* (2013.01); *H04W 56/00* (2013.01); *H04W 56/0045* (2013.01); *H04W 72/04* (2013.01); *H04W 74/0833* (2013.01)

(58) Field of Classification Search
None
See application file for complete search history.

(56) References Cited

U.S. PATENT DOCUMENTS 9,094,176 B2 *  7/2015  Bergstrom ............ H04L 5/0078
10,194,434 B2 *  1/2019  Axmon ............. H04W 72/1268
(Continued)

OTHER PUBLICATIONS

Official Communication issued in International Patent Application No. PCT/JP2017/044168, dated Feb. 27, 2018.
(Continued)

*Primary Examiner* — Sithu Ko
(74) *Attorney, Agent, or Firm* — ScienBiziP, P.C.

(57) ABSTRACT

A terminal apparatus applies, in a case that a handover command is received, and the handover command includes skip information (rach-Skip) for indicating that a random access procedure for a target primary cell is skipped, a value of $N_{TA}$ indicated by target TA information (targetTA) included in the skip information (rach-Skip) to a target primary Timing Advance Group (TAG) after synchronization with a downlink of the target primary cell is initiated, and starts a Time Alignment (TA) timer associated with the target primary TAG.

6 Claims, 10 Drawing Sheets

(51) Int. Cl.
  *H04W 56/00* (2009.01)
  *H04W 74/08* (2009.01)
  *H04W 72/04* (2009.01)

(56) References Cited

U.S. PATENT DOCUMENTS

| | | | |
|---|---|---|---|
| 10,219,257 B2* | 2/2019 | Yang | H04L 1/1854 |
| 10,334,652 B2* | 6/2019 | Rahman | H04W 56/00 |
| 2015/0223124 A1* | 8/2015 | Wang | H04W 72/0446 |
| | | | 455/436 |
| 2015/0304891 A1* | 10/2015 | Dinan | H04W 12/1006 |
| | | | 370/331 |
| 2016/0227503 A1* | 8/2016 | Dalsgaard | H04W 56/0045 |
| 2018/0020472 A1* | 1/2018 | Lin | H04W 36/08 |
| 2018/0213457 A1* | 7/2018 | Tang | H04W 36/08 |

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, pp. 1-142.

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, pp. 1-121.

"3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015, pp. 1-326.

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, pp. 1-82.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0, Dec. 2015, pp. 1-507.

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.0, Nov. 2015, pp. 1-86.

CATT, "Issues on RACH-less handover", 3GPP TSG RAN WG2 Meeting #95, R2-165181, Aug. 22-26, 2016, 4 pages.

* cited by examiner

MAC procedure

(500) When the MAC entity has a C-RNTI, the MAC entity shall for each subframe during which it monitors PDCCH and for each Serving Cell:

> 1> (501) if the MAC entity is configured with *rach-Skip* and a downlink control information for this subframe has been received on the PDCCH of the primary cell addressed to the C-RNTI:
>
> > 2> (502) provide an successful reception indication to the upper layer (RRC).

FIG. 5

RRC procedure

(600) If the received *RRCConnectionReconfiguration* message includes the *mobilityControlInfo* and the terminal device 1 is able to comply with the configuration included in this *RRCConnectionReconfiguration* message, the terminal device 1 shall:

1> (601) start timer T304;

1> (602) start synchronising to the downlink of the target primary cell;

1> (603) if the received *RRCConnectionReconfiguration* message includes the *rach-Skip*:

2> (604) apply the $N_{TA}$ value for the target primary TAG of MCG, as indicated by *targetTA*, or 2> (605) submit the $N_{TA}$ value for the target primary TAG of MCG to the lower layer (MAC), as indicated by *targetTA*;

1> (606) submit the *RRCConnectionReconfigurationComplete* message to lower layers (MAC) for transmission;

1> (607) if the successful reception indication is provided from the lower layer (MAC):

2> (608) stop timer T304; and

2> (609) release rach-Skip.

FIG. 6

MAC procedure

The MAC entity shall:

1> (A1) when *rach-Skip* is received;

1> (A2) when *rach-Skip* is configured by RRC; or

1> (A3) when the $N_{TA}$ value (timing adjustment indication) indicated by *targetTA* is applied for the primary TAG:

2> (A4) start the time alignment timer associated with the primary TAG.

1> (A5) when the $N_{TA}$ value (timing adjustment indication) is indicated by RRC 2> (A6) apply the $N_{TA}$ value (timing adjustment indication) for the pTAG;

2> (A7) start the time alignment timer associated with the pTAG.

1> (A8) when *rach-Skip* is released by RRC;

2> (A9) start the time alignment timer associated with the pTAG.

1> (A10) when a Timing Advance Command MAC control element is received:

2> (A11) apply the Timing Advance Command for the indicated TAG;

2> (A12) start or restart the time alignment timer associated with the indicated TAG.

FIG. 7

MAC procedure

(B1) The MAC entity shall not perform any uplink transmission on a Serving Cell except the Random Access Preamble transmission when the time alignment timer associated with the TAG to which this Serving Cell belongs is not running.

(B2) When the time alignment timer associated with the primary TAG is not running, the MAC entity shall not perform any uplink transmission on any Serving Cell except the Random Access Preamble transmission on the Primary Cell.

(B3) When the time alignment timer associated with the primary TAG is not running except that *rach-skip* is configured, the MAC entity shall not perform any uplink transmission on any Serving Cell except the Random Access Preamble transmission on the primary cell.

(B4) If the *rach-skip* is configured, the MAC entity shall assume that the time alignment timer associated with the primary TAG is running.

(B5) A MAC entity stores or maintains $N_{TA}$ upon expiry of associated time alignment timer.

(B6) A MAC entity maintains the time alignment timer and stores or maintains $N_{TA}$ upon release of *rach-skip* including *targetTA*.

(B7) The MAC entity applies a received Timing Advance Command MAC control element and starts associated time alignment timer also when the time alignment timer is not running or even if *rach-Skip* has been released.

FIG. 8

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-239425 filed on Dec. 9, 2016, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP) (NPL 1, 2, 3, 4, and 5). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

In order to reduce handover delay, (i) handover by a terminal apparatus from a source cell to a target cell without performing a random access procedure, and (ii) pre-assignment of an uplink grant for transmission of a handover command response (RRC Connection Reconfiguration Complete message) by a handover command have been considered (NPL 6).

CITATION LIST

Non Patent Literature

NPL 1: "3GPP TS 36.211 V13.0.0 (2015-December)", 6 Jan. 2016.
NPL 2: "3GPP TS 36.212 V13.0.0 (2015-December)", 6 Jan. 2016.
NPL 3: "3GPP TS 36.213 V13.0.0 (2015-December)", 6 Jan. 2016.
NPL 4: "3GPP TS 36.321 V13.0.0 (2015-December)", 14 Jan. 2016.
NPL 5: "3GPP TS 36.331 V13.0.0 (2015-December)", 7 Jan. 2016.
NPL 6: "3GPP TR 36.881 v0.5.0 (2015-November)", R2-157181, 4 Dec. 2015.

SUMMARY OF INVENTION

Technical Problem

An aspect of the present invention provides a terminal apparatus capable of efficiently communicating with a base station apparatus, a base station apparatus communicating with the terminal apparatus, a communication method used for the terminal apparatus, a communication method used for the base station apparatus, an integrated circuit to be mounted on the terminal apparatus, and an integrated circuit to be mounted on the base station apparatus.

Solution to Problem (1) According to some aspects of the present invention, the following measures are provided. That is, a first aspect of the present invention is a terminal apparatus that includes a receiver 10 configured to receive a handover command, and a higher layer processing unit 14 configured to apply, in a case that the handover command is received, and the handover command includes skip information (rach-Skip) for indicating that a random access procedure for a target primary cell is skipped, a value of $N_{TA}$ indicated by target TA information (targetTA) included in the skip information (rach-Skip) to a target primary Timing Advance Group (TAG) after synchronization with a downlink of the target primary cell is initiated, and start a Time Alignment (TA) timer associated with the target primary TAG.

(2) A second aspect of the present invention is a terminal apparatus 1, in which the higher layer processing unit stores or retains the value of $N_{TA}$, even in a case that the skip information (rach-Skip) including the target TA information (targetTA) is released.

(3) A third aspect of the present invention is a communication method used for the terminal apparatus 1, the communication method including the steps of receiving a handover command, in a case that the handover command is received, and the handover command includes skip information (rach-Skip) indicating that a random access procedure for a target primary cell is skipped, applying a value of $N_{TA}$ indicated by target TA information (targetTA) included in the skip information (rach-Skip) to a target primary Timing Advance Group (TAG) after synchronization with a downlink of the target primary cell is initiated, and starting a Time Alignment (TA) timer associated with the target primary TAG.

(4) A fourth aspect of the present invention is a communication method used for the terminal apparatus 1, in which the value of $N_{TA}$ is stored or retained, even in a case that the skip information (rach-Skip) including the target TA information (targetTA) is released.

Advantageous Effects of Invention

According to an aspect of the present invention, a terminal apparatus and a base station apparatus can efficiently communicate with each other.

BRIEF DESCRIPTION OF DRAWINGS

FIG. 5 is a diagram illustrating an example of MAC processing in a MAC entity of the terminal apparatus 1 according to the present embodiment.

FIG. 6 is a diagram illustrating an example of RRC processing of the terminal apparatus 1 according to the present embodiment.

FIG. 7 is a diagram illustrating an example of MAC processing associated with a TA timer according to the present embodiment.

FIG. 8 is a diagram illustrating another example of the MAC processing associated with the TA timer in the MAC according to the present embodiment.

DESCRIPTION OF EMBODIMENT

The embodiment of the present invention will be described below.

Figure 1:
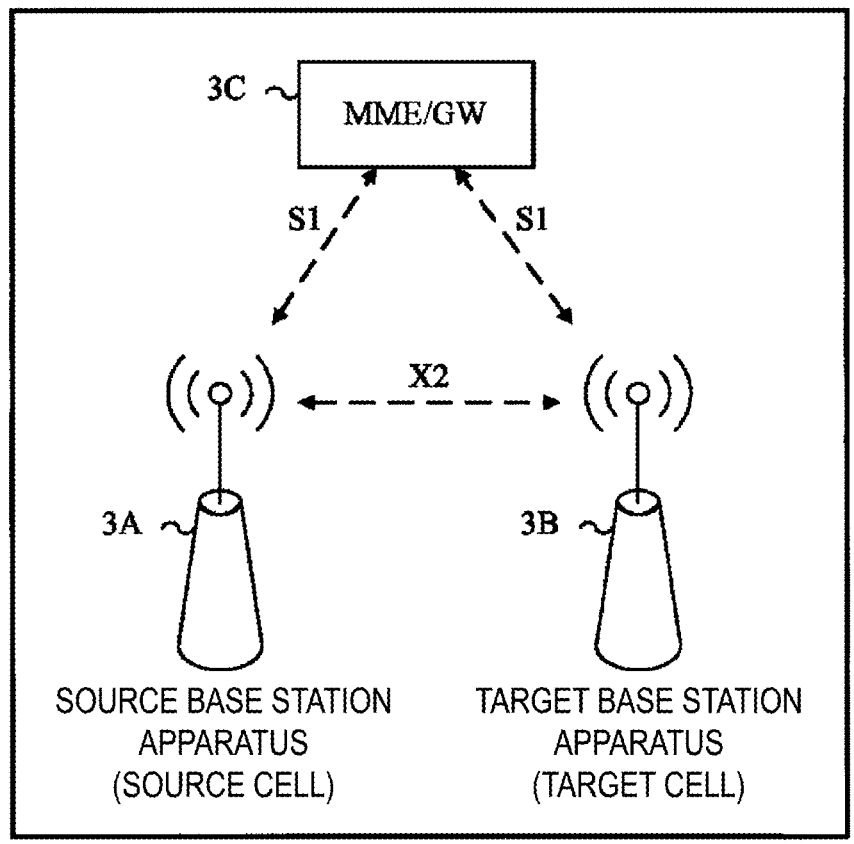
FIG. 1 is a conceptual diagram of a radio communication system according to the present embodiment.

FIG. 1 is a conceptual diagram of a radio communication system according to the present embodiment. In FIG. 1, the radio communication system includes the terminal apparatus 1 and a base station apparatus 3. The base station apparatus 3 includes a source base station apparatus 3A, the target base station apparatus 3B, and a Mobility Management Entity (MME)/GateWay (GW). A Uu is a radio access link between the terminal apparatus 1 and the base station apparatus 3. The Uu includes an uplink from the terminal apparatus 1 to the base station apparatus 3, and a downlink from the base station apparatus 3 to the terminal apparatus 1. An X2 is a backhaul link between the source base station apparatus 3A and the target base station apparatus 3B. An S1 is a backhaul link between the source base station apparatus 3A/target base station apparatus 3B and the MME/GW.

The terminal apparatus 1 may hand over from the source base station apparatus 3A to the target base station apparatus 3B. The terminal apparatus 1 may hand over from a source cell to a target cell. A source cell may be managed by the source base station apparatus 3A. A target cell may be managed by the target base station apparatus 3B. The source base station apparatus 3A and the target base station apparatus 3B may be the same apparatus. In other words, the terminal apparatus 1 may hand over from a source cell managed by the source base station apparatus 3A to a target cell managed by the source base station apparatus 3A. A source cell is also referred to as a source primary cell. A target cell is also referred to as a target primary cell.

Hereinafter, carrier aggregation will be described.

According to the present embodiment, multiple serving cells are configured for the terminal apparatus 1. A technology by which the terminal apparatus 1 communicates via multiple serving cells is referred to as cell aggregation or carrier aggregation. In the carrier aggregation, multiple serving cells that are configured are also referred to as aggregated serving cells.

Time Division Duplex (TDD) and/or Frequency Division Duplex (FDD) is applied to the radio communication system in the present embodiment. For the cell aggregation, the TDD may be applied to all multiple serving cells. Alternatively, in a case of the cell aggregation, serving cells to which the TDD is applied and serving cells to which the FDD is applied may be aggregated. In the present embodiment, the serving cells to which the TDD is applied are also referred to as TDD serving cells.

Multiple serving cells that are configured include one primary cell and one or multiple secondary cells. The primary cell is a serving cell in which an initial connection establishment procedure has been performed, a serving cell in which a connection re-establishment procedure has been initiated, or a cell indicated as a primary cell during a handover procedure. The secondary cell may be configured at a point of time at which or after a Radio Resource Control (RRC) connection is established.

The primary cell may include a source primary cell and a target primary cell.

A carrier corresponding to a serving cell in a downlink is referred to as a downlink component carrier. A carrier corresponding to a serving cell in an uplink is referred to as an uplink component carrier. The downlink component carrier and the uplink component carrier are collectively referred to as a component carrier.

The terminal apparatus 1 can perform simultaneous transmission of multiple physical channels/multiple physical signals in aggregated multiple serving cells (component carriers). The terminal apparatus 1 can perform simultaneous reception of multiple physical channels/multiple physical signals in aggregated multiple serving cells (component carriers).

In a case that DC is configured for the terminal apparatus, a Master Cell Group (MCG) is a subset of all serving cells, and a Secondary Cell Group (SCG) is a subset of serving cells that are not part of the MCG. In a case that the DC is not configured for the terminal apparatus, an MCG includes all serving cells. An MCG includes a primary cell, and equal to or more than zero secondary cells. An SCG includes a primary secondary cell, and equal to or more than zero secondary cells.

An MCG may include one primary TAG, and equal to or more than zero secondary TAGs. An SCG may include one primary TAG, and equal to or more than zero secondary TAGs.

A Timing Advance Group (TAG) is a group of serving cells configured by Radio Resource Control (RRC). The same timing advance value is applied to serving cells included in the same TAG. Timing advance is used to adjust transmission timing of PUSCH/PUCCH/SRS/DMRS in a serving cell. A primary TAG of an MCG may include one primary cell, and equal to or more than zero secondary cells. A primary TAG of an SCG may include a primary secondary cell, and equal to or more than zero secondary cells. A secondary TAG may include equal to or more than one secondary cells. A secondary TAG does not include a primary cell and a primary secondary cell.

Figure 2:
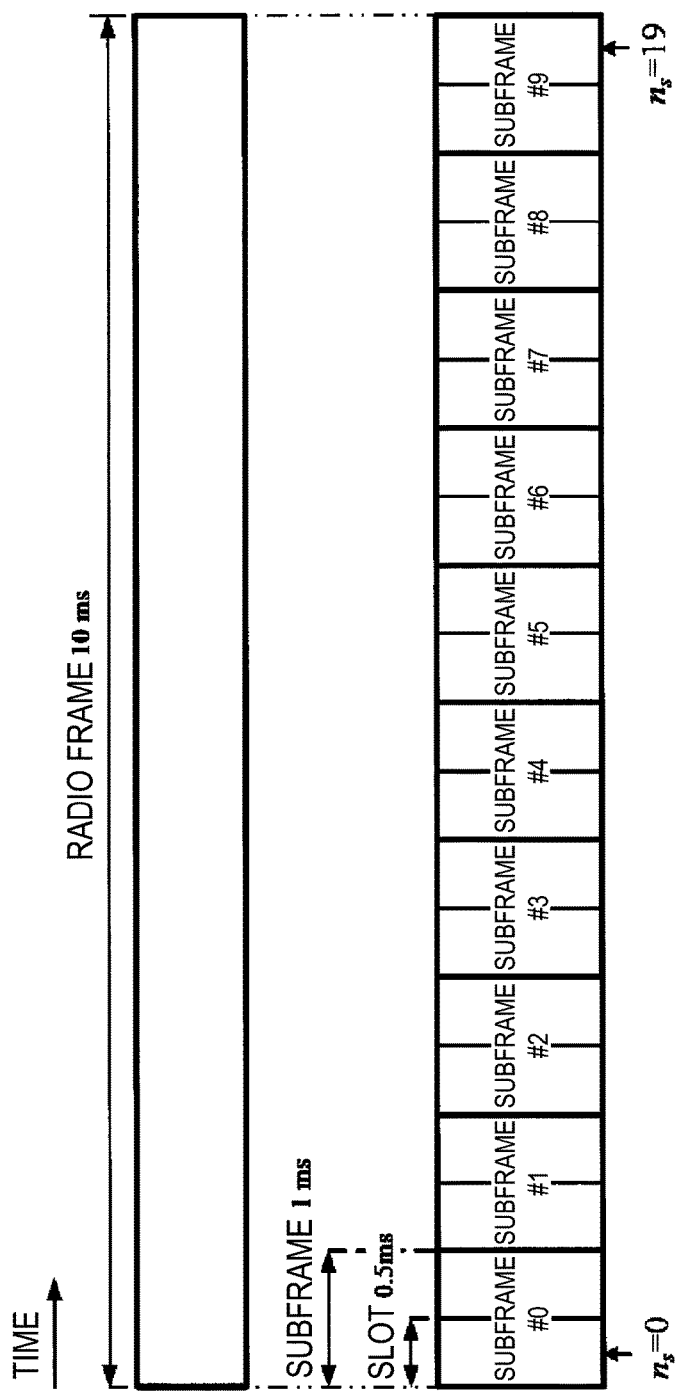
FIG. 2 is a diagram illustrating a schematic configuration of a radio frame according to the present embodiment.

FIG. 2 is a diagram illustrating a schematic configuration of a radio frame according to the present embodiment. In FIG. 2, a horizontal axis is a time axis.

Various field sizes in a time domain are expressed by the number of time unit $T_s=1/(15000*2048)$ seconds. A length of the radio frame satisfies $T_r=307200*T_s=10$ ms (milliseconds). Each radio frame includes ten contiguous subframes in the time domain. A length of each subframe is $T_{subframe}=30720*T_s=1$ ms. Each subframe i includes two contiguous slots in the time domain. The two contiguous slots in the time domain are a slot having a slot number $n_s$ of 2i in the radio frame and a slot having a slot number $n_s$ of 2i+1 in the radio frame. A length of each slot is $T_{slot}=15360*T_s=0.5$ ms. Each radio frame includes ten contiguous subframes in the time domain. Each radio frame includes 20 contiguous slots ($n_s=0, 1, \ldots, 19$) in the time domain. A subframe is also referred to as a Transmission Time Interval (TTI).

Figure 3:
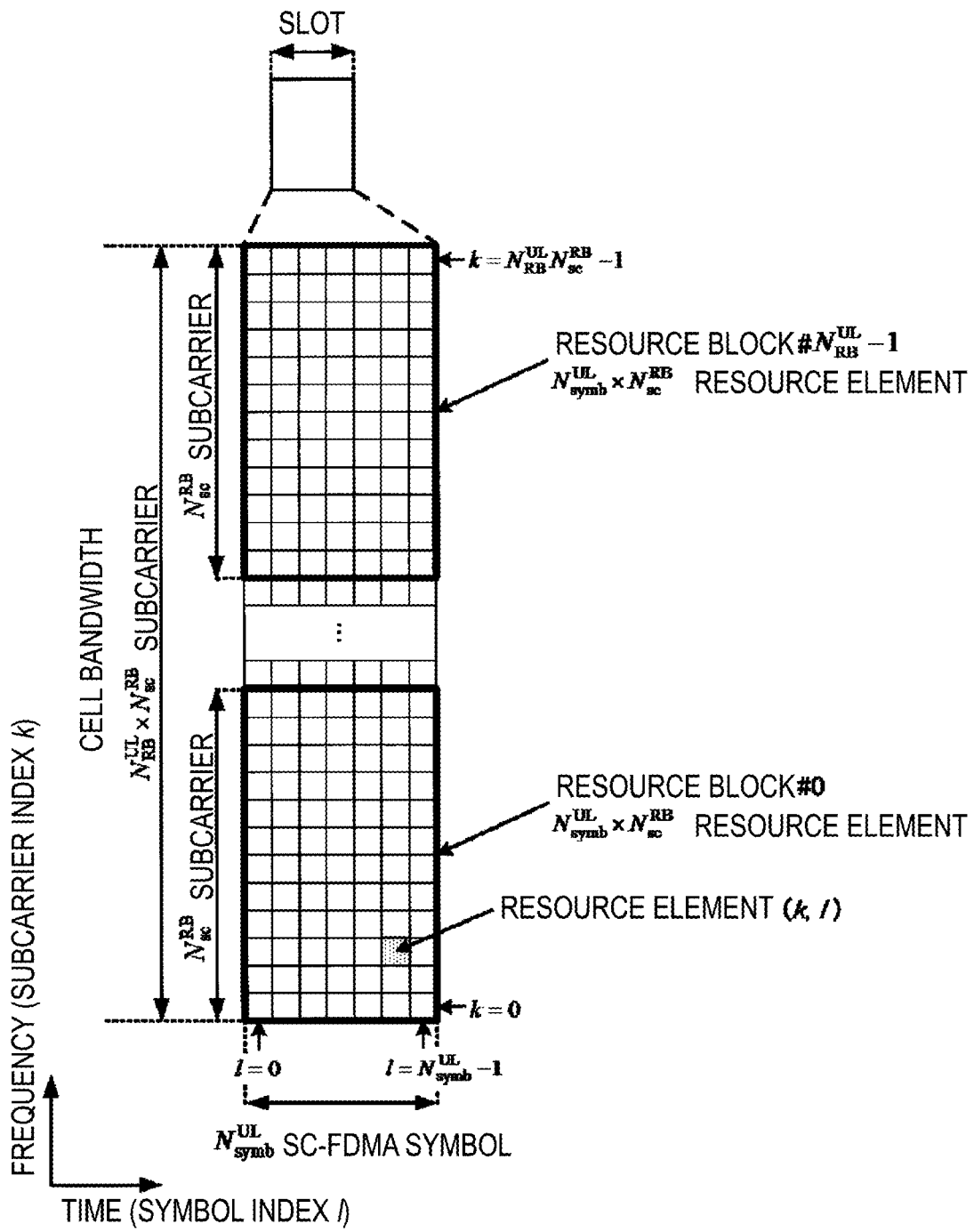
FIG. 3 is a diagram illustrating a schematic configuration of an uplink slot according to the present embodiment.

A configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, a horizontal axis is a time axis, and a vertical axis is a frequency axis. In FIG. 3, 1 is a Single Carrier-Frequency Division Multiple Access (SC-FDMA) symbol number/index, and k is a subcarrier number/index.

A physical signal or a physical channel transmitted in each slot is expressed by a resource grid. In an uplink, the resource grid is defined by multiple subcarriers and multiple SC-FDMA symbols. Each element within the resource grid is referred to as a resource element. The resource element is expressed by a subcarrier number/index k and an SC-FDMA symbol number/index l.

The resource grid is defined for each antenna port. In the present embodiment, description is given for one antenna port. The present embodiment may be applied to each of multiple antenna ports.

The uplink slot includes multiple SC-FDMA symbols l (l=0, 1, ..., $N^{UL}_{symb}$) in the time domain. $N^{UL}_{symb}$ indicates the number of SC-FDMA symbols included in one uplink slot. For a normal Cyclic Prefix (CP), $N^{UL}_{symb}$ is 7. For an extended Cyclic Prefix (CP), $N^{UL}_{symb}$ is 6.

The uplink slot includes multiple subcarriers k (k=0, 1, ..., $N^{UL}_{RB}*N^{RB}_{sc}$) in a frequency domain. $N^{UL}_{RB}$ is an uplink bandwidth configuration for a serving cell expressed by a multiple of $N^{RB}_{sc}$. $N^{RB}_{sc}$ is a (physical) resource block size in the frequency domain expressed by the number of subcarriers. In the present embodiment, a subcarrier interval Δf is 15 kHz, and $N^{RB}_{sc}$ is 12 subcarriers. In other words, in the present embodiment, $N^{RB}_{sc}$ is 180 kHz.

A resource block is used to express mapping of a physical channel to a resource element. For the resource block, a virtual resource block and a physical resource block are defined. The physical channel is first mapped to the virtual resource block. Thereafter, the virtual resource block is mapped to the physical resource block. One physical resource block is defined by $N^{UL}_{symb}$ consecutive SC-FDMA symbols in the time domain and by $N^{RB}_{sc}$ consecutive subcarriers in the frequency domain. Hence, one physical resource block is constituted by ($N^{UL}_{symb}*N^{RB}_{sc}$) resource elements. One physical resource block corresponds to one slot in the time domain. Physical resource blocks are numbered (0, 1, ..., $N^{UL}_{RB}-1$) in an ascending order of frequencies in the frequency domain.

A downlink slot according to the present embodiment includes multiple OFDM symbols. Since a configuration of the downlink slot according to the present embodiment is the same as the configuration of the uplink slot, except that a resource grid is defined by multiple subcarriers and multiple OFDM symbols, description of the configuration of the downlink slot will be omitted.

Physical channels and physical signals in the present embodiment will be described.

In FIG. 1, in uplink radio communication from the terminal apparatus 1 to the base station apparatus 3, the following uplink physical channels are used. The uplink physical channels are used by a physical layer for transmission of information output from a higher layer.

Physical Uplink Control CHannel (PUCCH)
Physical Uplink Shared CHannel (PUSCH)
Physical Random Access CHannel (PRACH)

The PUCCH is used to transmit Uplink Control Information (UCI). The uplink control information includes: downlink Channel State Information (CSI); a Scheduling Request (SR) used to request for the PUSCH (UpLink-Shared CHannel: UL-SCH) resource for new transmission; and a Hybrid Automatic Repeat reQuest ACKnowledgement (HARQ-ACK) for downlink data (a Transport block, a Medium Access Control Protocol Data Unit (MAC PDU), a DownLink-Shared CHannel (DL-SCH), or a Physical Downlink Shared CHannel (PDSCH)). The HARQ-ACK indicates an ACKnowledgement (ACK) or a Negative-ACKnowledgement (NACK). The HARQ-ACK is also referred to as an HARQ feedback, HARQ information, HARQ control information, and an ACK/NACK.

The PUSCH is used for transmission of uplink data (UpLink-Shared CHannel (UL-SCH)). The PUSCH may be used to transmit the HARQ-ACK and/or channel state information along with the uplink data. Furthermore, the PUSCH may be used to transmit only the channel state information or to transmit only the HARQ-ACK and the channel state information. The PUSCH is used to transmit a random access message 3.

The PRACH is used to transmit a random access preamble (random access message 1). The PRACH is used for indicating the initial connection establishment procedure, the handover procedure, the connection re-establishment procedure, synchronization (timing adjustment) for uplink transmission, and a request for the PUSCH (UL-SCH) resource.

In FIG. 1, the following uplink physical signal is used in the uplink radio communication. The uplink physical signal is not used for transmitting information output from the higher layer, but is used by the physical layer.

UpLink Reference Signal (UL RS)

According to the present embodiment, the following two types of uplink reference signals are used.

DeModulation Reference Signal (DMRS)
Sounding Reference Signal (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 may use the SRS to measure a channel state. The SRS is transmitted in a last SC-FDMA symbol in an uplink subframe, or an SC-FDMA symbol in an UpPTS.

In FIG. 1, the following downlink physical channels are used for downlink radio communication from the base station apparatus 3 to the terminal apparatus 1. The downlink physical channels are used by the physical layer for transmission of information output from the higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)
Physical Multicast CHannel (PMCH)

The PBCH is used for broadcasting a Master Information Block (MIB, a Broadcast CHannel (BCH)) that is shared by the terminal apparatuses 1. The MIB is transmitted at intervals of 40 ms, and, within the interval, the MIB is repeatedly transmitted every 10 ms. Specifically, new transmission of the MIB is performed in a subframe 0 in a radio frame that satisfies SFN mod 4=0, and retransmission (repetition) of the MIB is performed in subframes 0 in all the other radio frames. The System Frame Number (SFN) is a radio frame number. The MIB is system information. For example, the MIB includes information indicating the SFN.

The PCFICH is used for transmission of information indicating a region (OFDM symbols) to be used for transmission of the PDCCH.

The PHICH is used for transmission of an HARQ indicator for uplink data (UpLink-Shared CHannel (UL-SCH))

received by the base station apparatus 3. The HARQ indicator indicates the HARQ-ACK.

The PDCCH and the EPDCCH are used to transmit Downlink Control Information (DCI). The downlink control information is also referred to as a DCI format. The downlink control information includes a downlink grant and an uplink grant. The downlink grant is also referred to as downlink assignment or downlink allocation.

One downlink grant is used for scheduling one PDSCH within one serving cell. The downlink grant is used for the scheduling of the PDSCH within the same subframe as the subframe in which the downlink grant is transmitted.

One uplink grant is used for scheduling one PUSCH within one serving cell. The uplink grant is used for scheduling of the PUSCH within the fourth or later subframe from the subframe in which the uplink grant is transmitted.

The uplink grant transmitted on the PDCCH includes a DCI format 0. A transmission scheme for the PUSCH corresponding to the DCI format 0 is a single antenna port transmission scheme. The terminal apparatus 1 uses the single antenna port transmission scheme for transmission of the PUSCH corresponding to the DCI format 0. The PUSCH to which the single antenna port transmission scheme is applied is used for transmission of one codeword (one transport block).

The uplink grant transmitted on the PDCCH includes a DCI format 4. A transmission scheme for the PUSCH corresponding to the DCI format 4 is a closed-loop spatial multiplexing transmission scheme. The terminal apparatus 1 uses the closed-loop spatial multiplexing transmission scheme for transmission of the PUSCH corresponding to the DCI format 4. The PUSCH to which the closed-loop spatial multiplexing transmission scheme is applied is used for transmission of up to two codewords (up to two transport blocks).

CRC parity bits to be attached to the downlink grant or the uplink grant are scrambled with a Cell-Radio Network Temporary Identifier (C-RNTI), Temporary C-RNTI, or a Semi Persistent Scheduling Cell-Radio Network Temporary Identifier (SPS C-RNTI). The C-RNTI and the SPS C-RNTI are identifiers for identifying a terminal apparatus within a cell. The Temporary C-RNTI is used during a contention-based random access procedure. The uplink grant to which the CRC parity bits scrambled with the RNTI are attached is also referred to as an uplink grant for the RNTI or an uplink grant corresponding to the RNTI. The PDCCH including the uplink grant to which the CRC parity bits scrambled with the RNTI are attached is also referred to as the PDCCH for the RNTI, the PDCCH corresponding to the RNTI, or the PDCCH addressed to the RNTI.

The C-RNTI is used to control the PDSCH or the PUSCH in one subframe. The terminal apparatus 1 may transmit the PUSCH including a transport block, based on detection of the PDCCH including the uplink grant to which the CRC parity bits scrambled with the C-RNTI are attached. Retransmission of the transport block may be indicated by the PDCCH including the uplink grant to which the CRC parity bits scrambled with the C-RNTI are attached.

The SPS C-RNTI is used to periodically allocate a resource for the PDSCH or the PUSCH. The terminal apparatus 1 detects the PDCCH including the uplink grant to which CRC parity bits scrambled with SPS C-RNTI are attached, and, in a case that the uplink grant is determined to be valid as an SPS activation command, stores the uplink grant as a configured uplink grant. A MAC layer of the terminal apparatus 1 considers that the configured uplink grant periodically occurs. A subframe in which the configured uplink grant is considered to occur is given by a first period and a first offset. The terminal apparatus 1 receives information indicating the first period from the base station apparatus 3. Retransmission of a transport block transmitted on the periodically allocated PUSCH is indicated by the uplink grant to which the CRC parity bits scrambled with SPS C-RNTI are attached. The configured uplink grant is also referred to as an uplink grant configured by Medium Access Control (MAC), or a first configured uplink grant.

A random access response includes a Random Access Response grant (an RAR grant). The RAR grant is an uplink grant transmitted on the PDSCH. The terminal apparatus 1 may transmit the message 3 by using the PUSCH corresponding to the RAR grant. The terminal apparatus 1 uses the single antenna port transmission scheme for transmission of the PUSCH corresponding to the RAR grant, and retransmission of the PUSCH for the same transport block.

The Temporary C-RNTI is used to schedule retransmission of the random access message 3 and transmission of a random access message 4. New transmission of the random access message 3 is scheduled by the Random Access Response grant (RAR grant).

A handover command may include a HandOver Command grant (an HOC grant). The HOC grant is an uplink grant transmitted on the PDSCH. The terminal apparatus 1 stores the HOC grant as a second configured uplink grant. A MAC layer of the terminal apparatus 1 considers that the second configured uplink grant periodically occurs. A subframe in which the second configured uplink grant is considered to occur is given by a second period and a second offset. The handover command includes information indicating the second period and the second offset. The handover command includes information indicating the first period. The terminal apparatus 1 may use the single antenna port transmission scheme for transmission of the PUSCH corresponding to the HOC grant, and retransmission of the PUSCH for the same transport block. Retransmission of the transport block transmitted on the periodically allocated PUSCH may be indicated by the uplink grant to which the CRC parity bits scrambled with C-RNTI are attached and/or the NACK. The second configured uplink grant is also referred to as an uplink grant configured by the Radio Resource Control (RRC), a pre-allocated uplink grant, or the second configured uplink grant.

In other words, the SPS C-RNTI is used for retransmission of the transport block transmitted on the PUSCH corresponding to the uplink grant (the first configured uplink grant) that is considered to occur periodically based on the first period, and the C-RNTI is used for retransmission of the transport block transmitted on the PUSCH corresponding to the uplink grant (the second configured uplink grant) that is considered to occur periodically based on the second period. The first period and the second period are configured separately.

The PUSCH corresponding to the uplink grant (the first configured uplink grant) that is considered to occur periodically based on the first period and the first offset may be scrambled with a scramble sequence generated at least based on the SPS C-RNTI. The PUSCH corresponding to the uplink grant (the second configured uplink grant) that is considered to occur periodically based on the second period and the second offset may be scrambled with a scramble sequence generated at least based on the C-RNTI.

The PDSCH is used to transmit downlink data (DownLink Shared CHannel (DL-SCH)). The PDSCH is used to transmit a random access message 2 (random access response). The PDSCH is used for transmission of a handover command.

The PMCH is used to transmit multicast data (Multicast CHannel (MCH)).

In FIG. 1, the following downlink physical signals are used for the downlink radio communication. The downlink physical signals are not used for transmission of information output from the higher layer, but are used by the physical layer.

Synchronization Signal (SS)

DownLink Reference Signal (DL RS)

The synchronization signal is used by the terminal apparatus 1 to take synchronization in a frequency domain and a time domain in a downlink. The synchronization signal includes a Primary Synchronization Signal (PSS) and a Secondary Synchronization Signal (SSS).

The downlink reference signal is used by the terminal apparatus 1 to perform channel compensation on a downlink physical channel. The downlink reference signal is used by the terminal apparatus 1 to calculate channel state information of the downlink.

According to the present embodiment, the following seven types of downlink reference signals are used.

Cell-specific Reference Signal (CRS)

UE-specific Reference Signal (URS) relating to the PDSCH

DeModulation Reference Signal (DMRS) relating to the EPDCCH

Non-Zero Power Channel State Information—Reference Signal (NZP CSI-RS)

Zero Power Channel State Information—Reference Signal (ZP CSI-RS)

Multimedia Broadcast and multicast service over Single Frequency Network Reference Signal (MBSFN RS)

Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in the Medium Access Control (MAC) layer is referred to as a transport channel. A unit of the transport channel used in the MAC layer is also referred to as a Transport Block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The base station apparatus 3 and the terminal apparatus 1 exchange (transmission and/or reception) a signal in the higher layer. For example, the base station apparatus 3 and the terminal apparatus 1 may transmit and/or receive, in a Radio Resource Control (RRC) layer, RRC signaling (also referred to as a Radio Resource Control message (RRC message) or Radio Resource Control information (RRC information)). Furthermore, the base station apparatus 3 and the terminal apparatus 1 may transmit and/or receive, in the Medium Access Control (MAC) layer, a MAC Control Element (CE). Here, the RRC signaling and/or the MAC CE is also referred to as higher layer signaling.

The PUSCH and the PDSCH are used to transmit the RRC signaling and the MAC CE. Here, the RRC signaling transmitted from the base station apparatus 3 on the PDSCH may be signalling common to multiple terminal apparatuses 1 in a cell. The RRC signaling transmitted from the base station apparatus 3 on the PDSCH may be signalling dedicated to a certain terminal apparatus 1 (also referred to as dedicated signaling or UE specific signaling). A cell-specific parameter may be transmitted by using the signalling common to the multiple terminal apparatuses 1 in the cell or the signalling dedicated to the certain terminal apparatus 1. A UE-specific parameter may be transmitted by using the signalling dedicated to the certain terminal apparatus 1.

Figure 4:
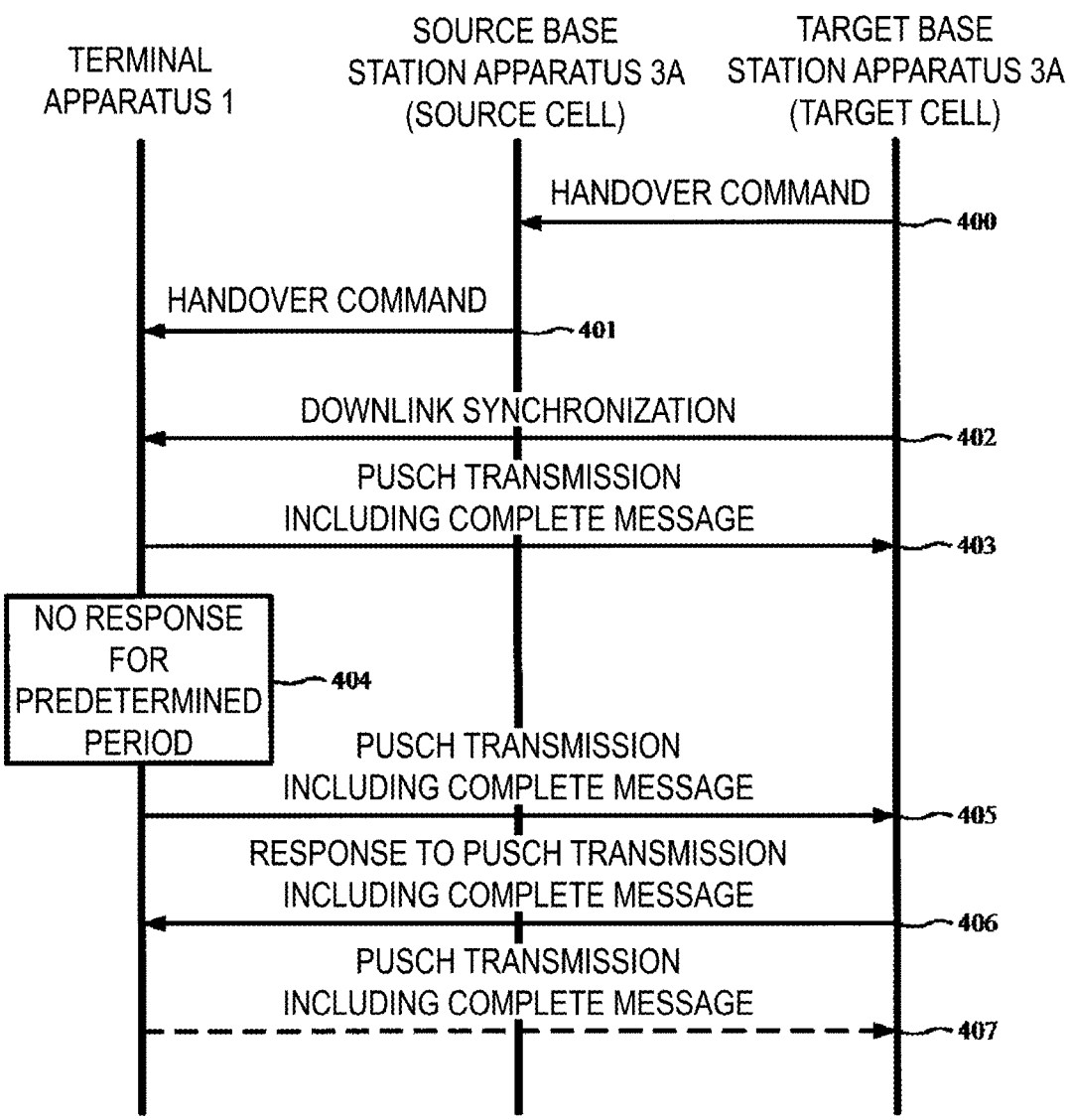
FIG. 4 is a diagram illustrating an example of a handover procedure according to the present embodiment.

FIG. 4 is a diagram illustrating an example of the handover procedure according to the present embodiment. The handover procedure is performed by the RRC.

(Step 400) The target base station apparatus 3B transmits a handover command to the source base station apparatus 3A. The handover command is a parameter RRCConnectionReconfiguration including a parameter mobilityControlInfo. The parameter mobilityControlInfo may include skip information (rach-skip) indicating that a random access procedure for a target cell is skipped, target TA information (targetTA) related to transmission timing in the target cell, the HOC grant, information for indicating the C-RNTI in the target cell, information for indicating the SPS C-RNTI in the target cell, information indicating the first period, information indicating the second period and the second offset, and information related to the target cell. The information related to the target cell may include information for indicating a Physical layer Cell Identity (PCI) of the target cell, and information for indicating a frequency of the target cell. The skip information may include the target TA information. The skip information is also referred to as rach-Skip. The target TA information is also referred to as targetTA. A value of $N_{TA}$ indicated by the target TA information is also referred to as Timing Adjustment Indication (TAI).

The target TA information (targetTA) indicates a value of $N_{TA}$ for a target primary cell. The value of $N_{TA}$ is used to adjust transmission timing of the PUSCH/PUCCH/SRS/DMRS. The value of $N_{TA}$ for the target primary cell may be a value of $N_{TA}$ for a target primary TAG of an MCG. The target TA information (targetTA) may indicate that a value of $N_{TA}$ for a target primary TAG of an MCG is zero. The target TA information (targetTA) may indicate that a value of $N_{TA}$ for a target primary TAG of an MCG is the same as a value of $N_{TA}$ for a source primary TAG of the MCG. Here, a primary TAG including a target primary cell is referred to as a target primary TAG. Here, a primary TAG including a source primary cell is referred to as a source primary TAG.

(Step 401) The source base station apparatus 3A transmits the handover command received from the source base station apparatus 3A to the terminal apparatus 1 by using the PDSCH.

(Step 402) The RRC of the terminal apparatus 1 starts a T304 timer. Next, the terminal apparatus 1 acquires downlink synchronization of the target cell based on the information related to the target cell. The terminal apparatus 1 may use part or all of a synchronization signal of the target cell, the CRS of the target cell, and the PBCH of the target cell, for the acquisition of the downlink synchronization. Next, after initiating the synchronization with the downlink, the terminal apparatus 1 applies the value of $N_{TA}$ indicated by the target TA information (targetTA). Here, the value of $N_{TA}$ may be managed by the MAC.

(Step 403) The terminal apparatus 1 transmits uplink data on the first PUSCH in the target cell. In a case that the skip information (rach-Skip) is configured, and the second configured uplink grant is present, the first PUSCH in the target cell may correspond to the second configured uplink grant. The uplink data may include a complete message (RRCConnectionReconfigurationComplete message). Here, transmission timing of transmission of the first PUSCH is configured based on the target TA information (targetTA). Here, the RRC of the terminal apparatus 1 passes the complete message for transmission to a lower layer (MAC) of the terminal apparatus 1.

(Step 404) The terminal apparatus 1 attempts to receive/decode a response to the PUSCH (uplink data) corresponding to the HOC grant for a predetermined period of time in the target cell. The response may be the PDCCH/EPDCCH including the C-RNTI indicated by the handover command.

(Step 405) In a case that there is no response in the predetermined period of time in step 404, the terminal apparatus 1 transmits the uplink data on the PUSCH based on the second configured uplink grant. The uplink data may include a complete message (RRCConnectionReconfigurationComplete message).

(Step 406) The terminal apparatus 1 detects a response to the PUSCH transmission in step 405. In a case that the skip information (rach-Skip) is configured for the terminal apparatus 1, and the response is received, the MAC of the terminal apparatus 1 may pass a successful reception indication to a higher layer (RRC). The successful reception indication may indicate that the PDCCH/EPDCCH including the C-RNTI indicated by the handover command is received. In a case that the successful reception indication is provided from the lower layer (MAC), the RRC of the terminal apparatus 1 may stop the T304 timer, consider that the handover is successful, and terminate the handover procedure. In the case that the successful reception indication is provided from the lower layer (MAC), the RRC of the terminal apparatus 1 may release the skip information (rach-Skip) and/or the target TA information (targetTA).

(Step 407) In a case that the NACK is detected in step 406, the terminal apparatus 1 retransmits the uplink data on the PUSCH, based on the HOC grant. The retransmission based on the NACK is referred to as non-adaptive retransmission.

(Step 407) In a case that the terminal apparatus 1 detects the PDCCH/EPDCCH including an uplink grant indicating retransmission in step 406, the terminal apparatus 1 retransmits the uplink data on the PUSCH, based on the uplink grant. The retransmission based on the uplink grant is referred to as adaptive retransmission. CRC parity bits to be attached to the uplink grant are scrambled with the C-RNTI.

The terminal apparatus 1, in a case that the T304 timer expires, may consider that the handover procedure fails.

The terminal apparatus 1 has one MAC entity for an MCG. The terminal apparatus 1 for which DC is configured has one MAC entity for an MCG, and one MAC entity for an SCG. A MAC entity performs processing of the MAC. Processing of a MAC entity for an MCG will be described below. An aspect of the present invention may be applied to a MAC entity for an SCG. In this case, a primary cell may be replaced with a primary secondary cell. Hereinafter, a MAC entity of the terminal apparatus 1 is simply referred to as a MAC entity.

FIG. 5 is a diagram illustrating an example of MAC processing in a MAC entity of the terminal apparatus 1 according to the present embodiment. FIG. 5 shows pseudo codes associated with the processing of the MAC.

(500) In a case that the MAC entity has the C-RNTI, the MAC entity performs a process (501) for each serving cell, and for each subframe in a period in which the MAC entity monitors the PDCCH.

(501) In a case that the skip information (rach-Skip) is configured for the MAC entity, and downlink control information for this subframe is received on the PDCCH of a primary cell, the MAC entity provides a successful reception indication to the higher layer (RRC) (502). Here, the PDCCH of the primary cell is the PDCCH addressed to the C-RNTI.

FIG. 6 is a diagram illustrating an example of RRC processing of the terminal apparatus 1 according to the present embodiment. FIG. 6 shows pseudo codes associated with the RRC processing (a handover procedure).

(600) In a case that a received RRCConnectionReconfiguration message includes mobilityControlInfo, and the terminal apparatus 1 can follow a configuration included in the RRCConnectionReconfiguration message (600), the terminal apparatus 1 performs a process (601) through a process (609). The process (601) through the process (609) may be performed sequentially from the process (601).

(601) The terminal apparatus 1 starts the T304 timer.

(602) The terminal apparatus 1 initiates synchronization with a downlink of a target primary cell.

(603) In a case that the received RRCConnectionReconfiguration message includes skip information (rach-Skip), the process (604) or the process (605) may be performed.

(604) The terminal apparatus 1 applies a value of $N_{TA}$ (timing adjustment indication) for a target primary TAG of an MCG indicated by target TA information (targetTA).

(605) The terminal apparatus 1 passes the value of $N_{TA}$ (timing adjustment indication) for the target primary TAG of the MCG indicated by the target TA information (targetTA) to a lower layer (MAC).

(606) The terminal apparatus 1 passes a complete message for transmission (RRCConnectionReconfigurationComplete message) to the lower layer (MAC).

(607) In a case that a successful reception indication is provided from the lower layer (MAC), the terminal apparatus 1 stops the T304 timer (608), and releases the skip information (rach-Skip) (609). Here, the skip information (rach-Skip) may include the target TA information (targetTA).

The terminal apparatus 1 receives a MAC CE (control element) including a Timing Advance (TA) command. The terminal apparatus 1 adjusts the value of $N_{TA}$ based on a value of $T_A$ indicated by the TA command included in the MAC CE. For example, a new value of $N_{TA}$ may be given based on an old value of $N_{TA}$ and a value of $T_A$. The MAC CE including the TA command is also referred to as a TA command MAC CE. A TA Command MAC CE includes information indicating a TAG to which the TA command MAC CE corresponds. The information indicating the TAG may indicate a primary TAG or a secondary TAG. The information indicating the TAG may indicate a TAG identifier. A TAG Identifier 0 may correspond to the primary TAG. A TAG Identifier 1 may correspond to the secondary TAG.

A Time Alignment (TA) timer will be described below.

A MAC Entity manages a TA timer and a value of $N_{TA}$. The MAC entity manages one TA timer and one value of $N_{TA}$ for each TAG. FIG. 7 is a diagram illustrating an example of MAC processing associated with a TA timer according to the present embodiment. FIG. 7 shows pseudo codes associated with processing of the TA timer. In FIG. 7, a process (A1) through a process (A12) may be performed sequentially from the process (A1).

The MAC Entity, (A1) in a case that skip information (rach-Skip) is received, (A2) in a case that skip information (rach-Skip) is configured by the RRC, or (A3) in a case that a value of $N_{TA}$ (TAI) indicated by target TA information (targetTA) is applied to a primary TAG, (A4) may start a TA timer associated with the primary TAG. Here, the primary TAG is a target primary TAG of an MCG. In the present embodiment, a case that only some of (A1) through (A3) are applied is also allowed. For example, a case that only (A3) of (A1) through (A3) is applied is also permitted.

The MAC entity, (A5) in a case that the value of $N_{TA}$ (TAI) indicated by the target TA information (targetTA) is indicated by the RRC, (A6) may apply the value of $N_{TA}$ (TAI) to the primary TAG, and (A7) may start the TA timer associated with the primary TAG. Here, the primary TAG is a target primary TAG of an MCG. In the present embodiment, in a case that (A5) through (A7) are applied, (A1) through (A4) need not be applied.

The MAC entity, (A8) in a case that the skip information (rach-Skip) is released by the RRC, (A9) may start the TA timer associated with the primary TAG. Here, the primary TAG is a target primary TAG of an MCG.

The MAC Entity, (A10) in a case that a TA command MAC CE is received, (A11) for a TAG indicated by information indicating a TAG included in the TA command MAC CE, applies a TA command included in the TA command MAC CE, and (A12) starts or restarts a TA timer associated with the TAG indicated by the information indicating the TAG included in the TA command MAC CE.

In the present embodiment, once a timer starts, the timer keeps running until the timer is stopped or the timer expires. In other cases, the timer is not running.

FIG. 8 is a diagram illustrating another example of the MAC processing associated with the TA timer in the MAC according to the present embodiment. FIG. 8 shows pseudo codes (B1) through (B7) associated with the processing of the TA timer. In the present embodiment, a case that only one of (B2) and (B3) is applied is also allowed. In the present embodiment, in a case that (B4) is applied, (A1) through (A9) need not be applied. In the present embodiment, in the case that (B4) is applied, (B3) need not be applied.

(B1) In a case that a TA timer associated with a TAG to which a serving cell belongs is not running, a MAC entity does not perform any uplink transmission except for random access preamble transmission in the serving cell. The uplink transmission except for the random access preamble transmission may include transmission of the PUSCH/PUCCH/SRS/DMRS. The random access preamble transmission may be the PRACH transmission.

(B2) In a case that a TA timer associated with a primary TAG is not running, the MAC entity does not perform uplink transmission in any serving cell, except for random access preamble transmission in a primary cell. The uplink transmission except for the random access preamble transmission in the primary cell may include transmission of the PUSCH/PUCCH/SRS/DMRS in the primary cell and a secondary cell, and random access preamble transmission in the secondary cell.

(B3) In a case that the TA timer associated with the primary TAG is not running except for a case that skip information (rach-skip) is configured, the MAC entity does not perform the uplink transmission in any serving cell, except for the random access preamble transmission in the primary cell. In other words, in a case that the skip information (rach-skip) is not configured, and the TA timer associated with the primary TAG is not running, the MAC entity does not perform the uplink transmission in any serving cell, except for the random access preamble transmission in the primary cell. In other words, in a case that the skip information (rach-skip) is configured, even in a case that the TA timer associated with the primary TAG is not running, the MAC entity may perform uplink transmission including a complete message (RRCConnectionReconfigurationComplete message) in the primary cell.

(B4) In the case that the skip information (rach-skip) is configured, the MAC entity may consider that the TA timer associated with the primary TAG is running. In other words, in the case that the skip information (rach-skip) is configured, the MAC entity may consider that the TA timer associated with the primary TAG is running, and perform the uplink transmission including the complete message (RRCConnectionReconfigurationComplete message) in the primary cell.

(B5) The MAC entity, even in a case that the TA timer expires, stores or manages a value of associated $N_{TA}$.

(B6) The MAC entity, even in a case that skip information (rach-skip) including target TA information (targetTA) indicating a value of $N_{TA}$ for a primary TAG is released, stores or manages the value of $N_{TA}$ for the primary TAG.

(B7) The MAC Entity, even in a case that the TA timer is not running, or that the target TA information (targetTA) indicating the value of $N_{TA}$ for the primary TAG is released, applies a TA command included in a received TA command MAC CE to the retained or managed value of $N_{TA}$, and starts an associated TA timer.

In a case that a received RRCConnectionReconfiguration message does not include skip information (rach-Skip), includes preamble information indicating an index of a random access preamble, the terminal apparatus 1, after receiving a complete message (RRCConnectionReconfigurationComplete message) for transmission from the RRC, and initiates a random access procedure in a target primary cell. In the random access procedure, the terminal apparatus 1 transmits the random access preamble based on the preamble information. In other words, the random access preamble is not selected by the terminal apparatus 1. In the random access procedure, the terminal apparatus 1 receives a random access response for the target primary cell. The random access response includes a TA command.

In a case that the terminal apparatus 1 receives the TA command included in the random access response for the target primary cell, and does not select the random access preamble, the terminal apparatus 1 (MAC entity) applies the TA command to a target primary TAG, and starts a TA timer associated with the target primary TAG. The terminal apparatus 1, while the TA timer is running, may transmit the complete message (RRCConnectionReconfigurationComplete message) by using the PUSCH. Here, a resource of the PUSCH may be allocated by an uplink grant included in the random access response.

Accordingly, the terminal apparatus 1 is capable of efficiently performing uplink transmission.

Configurations of apparatuses according to the present embodiment will be described below.

Figure 9:
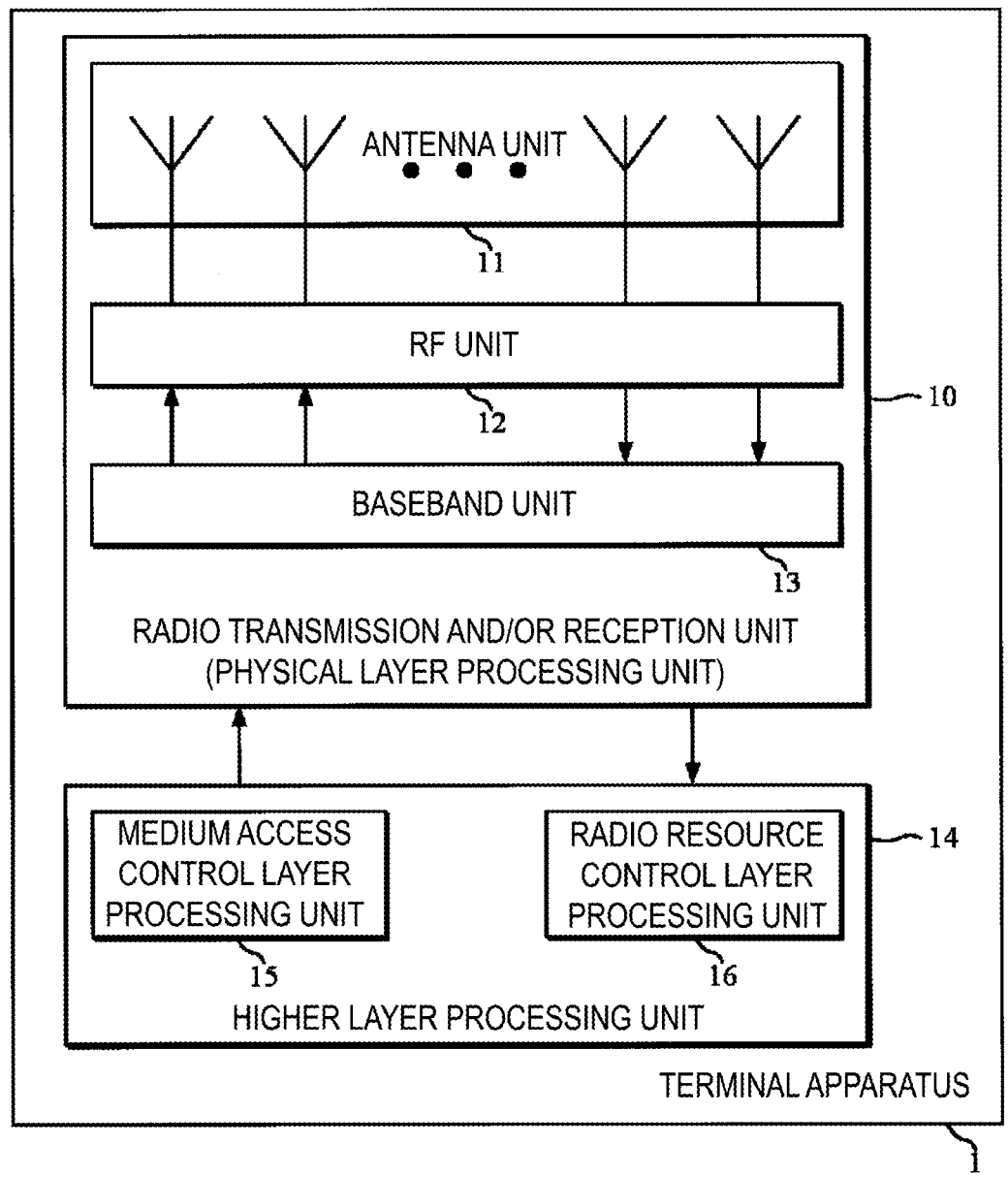
FIG. 9 is a schematic block diagram illustrating a configuration of the terminal apparatus 1 according to the present embodiment.

FIG. 9 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a radio frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 15 included in the higher layer processing unit 14 performs processing of the medium access control layer. The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the radio resource control layer. The radio resource control layer processing unit 16 manages various types of configuration information/parameters of its own apparatus. The radio resource control layer processing unit 16 sets various types of configuration information/parameters based on higher layer signaling received from the base station apparatus 3. Namely, the radio resource control layer processing unit 16 sets the various configuration information/parameters in accordance with the information indicating the various configuration information/parameters received from the base station apparatus 3.

The radio transmission and/or reception unit 10 performs processing of a physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in a frequency domain.

The baseband unit 13 generates an SC-FDMA symbol by performing Inverse Fast Fourier Transform (IFFT) of data, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 10:
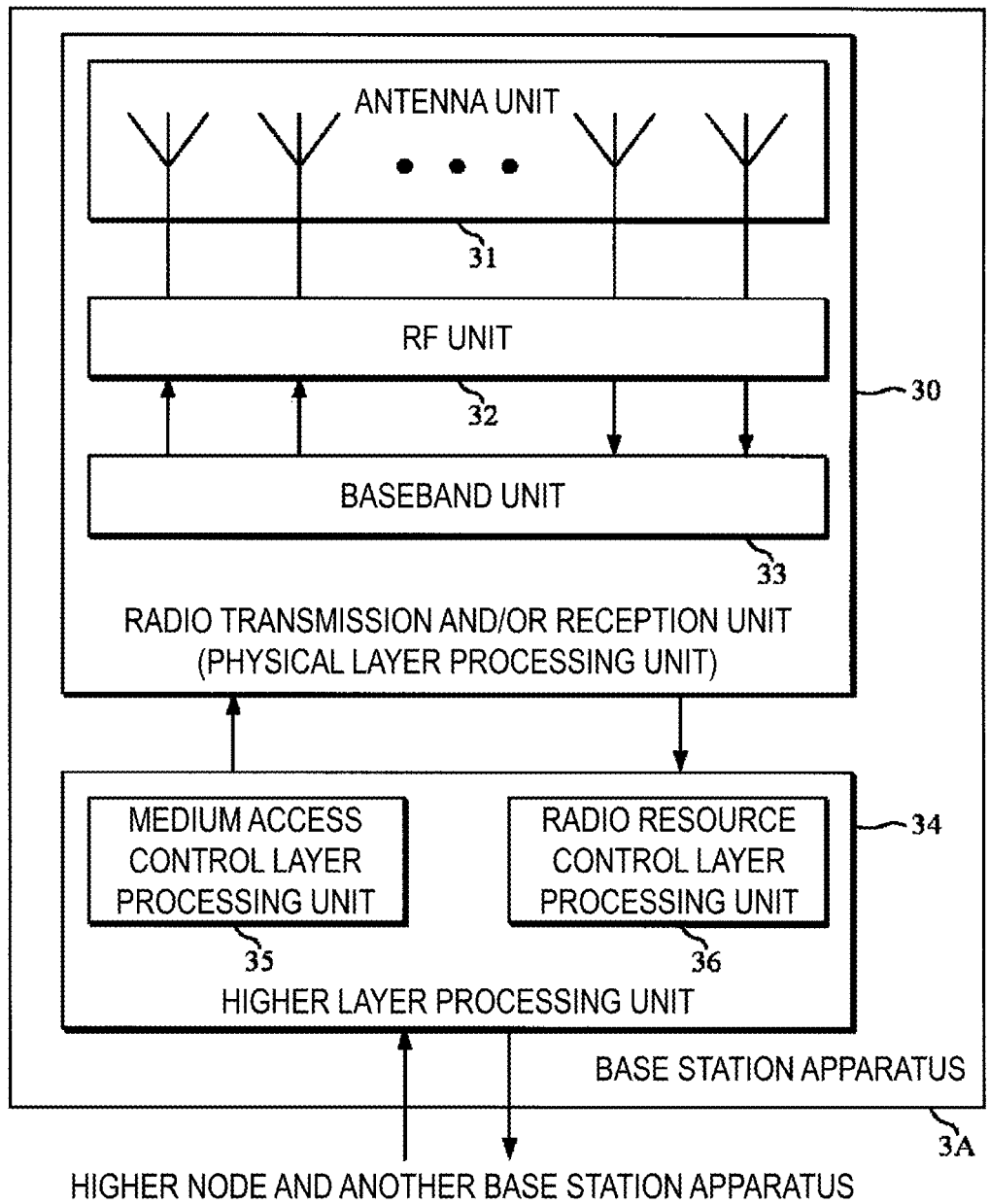
FIG. 10 is a schematic block diagram illustrating a configuration of a target base station apparatus 3B according to the present embodiment.

FIG. 10 is a schematic block diagram illustrating a configuration of the target base station apparatus 3B according to the present embodiment. As illustrated, the target base station apparatus 3B is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit. A configuration of the source base station apparatus 3A may be the same as the configuration of the target base station apparatus 3B.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing for the medium access control layer. The medium access control layer processing unit 35 performs processing associated with a scheduling request, based on various types of configuration information/parameters managed by the radio resource control layer processing unit 36. The higher layer processing unit 34 may transmit information to another base station apparatus and an MME/GW3C. The higher layer processing unit 34 may receive information from another base station apparatus and the MME/GW3C.

The radio resource control layer processing unit 36 included in the higher layer processing unit 34 performs processing for the radio resource control layer. The radio resource control layer processing unit 36 generates, or acquires from a higher node, downlink data (transport block) allocated on a physical downlink shared channel, system information, an RRC message, a MAC Control Element (CE), and the like, and outputs them to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. Namely, the radio resource control layer processing unit 36 transmits/broadcasts information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Various aspects of the terminal apparatus 1 according to the present embodiment will be described below.

(1) A first aspect of the present embodiment is the terminal apparatus 1 that includes the receiver 10 configured to receive a handover command, and the higher layer processing unit 14 configured to apply, in a case that the handover command is received, and the handover command includes skip information (rach-Skip) indicating that a random access procedure for a target primary cell is skipped, a value of $N_{TA}$ indicated by target TA information (targetTA) included in the skip information (rach-Skip) to a target primary Timing Advance Group (TAG) after synchronization with a downlink of the target primary cell is initiated, and start a Time Alignment (TA) timer associated with the target primary TAG.

(2) In the first aspect of the present embodiment, the higher layer processing unit 14 stores or retains the value of $N_{TA}$, even in a case that the skip information (rach-Skip) including the target TA information (targetTA) is released.

(3) A second aspect of the present embodiment is the terminal apparatus 1 that includes the receiver 10 configured to receive a handover command including skip information (rach-Skip) for indicating that a random access procedure for a target primary cell is skipped, and the higher layer processing unit 14 configured to consider, in a case that the skip information (rach-Skip) is configured, that a Time Alignment (TA) timer is running.

(4) A third aspect of the present embodiment is the terminal apparatus 1 that includes the receiver 10 configured to receive a handover command including skip information (rach-Skip) for indicating that a random access procedure for a target primary cell is skipped, and a transmitter 10 configured to perform uplink transmission, in which in a case that a Time Alignment (TA) timer associated with a primary Timing Advance Group (TAG) is not running, except for a case that the skip information (rach-Skip) is configured, the transmitter 10 does not perform uplink transmission in any serving cell, except for random access preamble transmission in a primary cell, and the primary cell includes the target primary cell.

Consequently, the terminal apparatus and the base station apparatus can efficiently communicate with each other.

The base station apparatus 3 according to an aspect of the present invention can also be achieved as an aggregation (an apparatus group) constituted of multiple apparatuses. Each of the apparatuses constituting such an apparatus group may include a portion or all of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

A program running on an apparatus according to an aspect of the present invention may serve as a program that controls a Central Processing Unit (CPU) and the like to cause a computer to operate in such a manner as to enable the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for enabling such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to enable some of the functions described above, and additionally may be configured to enable the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiment. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus, comprising:
a receiver configured to receive a handover command; and
a higher layer processing unit configured to apply, in a case that the handover command is received, and the handover command includes skip information (random access channel (rach)-Skip) for indicating that a random access procedure for a target primary cell is skipped, an indication indicated by target time alignment (TA) information (targetTA) included in the skip information (rach-Skip) to indicate that a target primary Timing Advance Group (TAG) has the same timing adjustment indication ($N_{TA}$) value as the latest $N_{TA}$ value of a source primary TAG of a Master Cell Group (MCG), and
start a TA timer associated with the target primary TAG.

2. The terminal apparatus of claim 1, wherein the TA timer is started after the synchronization with the downlink of the target primary cell is initiated.

3. The terminal apparatus of claim 2, wherein, for the synchronization with the downlink, the terminal apparatus is further configured to receive at least one of:
a synchronization signal of the target primary cell;
a cell-specific Reference signal (CRS) of the target primary cell; and
a physical broadcast channel (PBCH) of the target primary cell.

4. A communication method used for a terminal apparatus, the communication method comprising:
receiving a handover command;
in a case that the handover command is received, and the handover command includes skip information (random access channel (rach)-Skip) for indicating that a random access procedure for a target primary cell is skipped, applying an indication indicated by target time alignment (TA) information (targetTA) included in the skip information (rach-Skip) to indicate that a target primary Timing Advance Group (TAG) has the same timing adjustment indication ($N_{TA}$) value as the latest $N_{TA}$ value of a source primary TAG of a Master Cell Group (MCG); and
starting a TA timer associated with the target primary TAG.

5. The method of claim 4, wherein the TA timer is started after the synchronization with the downlink of the target primary cell is initiated.

6. The method of claim 5, wherein, for the synchronization with the downlink, the method further comprises receiving, by the terminal apparatus, at least one of:
a synchronization signal of the target primary cell;
a cell-specific Reference signal (CRS) of the target primary cell; and
a physical broadcast channel (PBCH) of the target primary cell.

* * * * *